United States Patent
Yasuda et al.

(10) Patent No.: US 7,168,731 B2
(45) Date of Patent: Jan. 30, 2007

(54) AIRBAG APPARATUS FOR AUTOMOBILE

(75) Inventors: Mitsuo Yasuda, Nanto (JP); Atsushi Kaneko, Nanto (JP); Yusuke Ishikuro, Nanto (JP)

(73) Assignee: Sanko Gosei Kabushiki Kaisha, Nanto (JP)

( * ) Notice: Subject to any disclaimer, the term of this patent is extended or adjusted under 35 U.S.C. 154(b) by 134 days.

(21) Appl. No.: 11/041,117

(22) Filed: Jan. 21, 2005

(65) Prior Publication Data

US 2005/0167956 A1 Aug. 4, 2005

(30) Foreign Application Priority Data

Feb. 4, 2004 (JP) ............... 2004-028259

(51) Int. Cl.
*B60R 21/20* (2006.01)
(52) U.S. Cl. .............. 280/728.3; 264/400; 219/124.69; 219/124.71
(58) Field of Classification Search ............ 280/728.3, 280/732; 219/121.68–121.71; 264/400
See application file for complete search history.

(56) References Cited

U.S. PATENT DOCUMENTS

| | | | | |
|---|---|---|---|---|
| 5,738,367 A | * | 4/1998 | Zichichi et al. | 280/728.3 |
| 6,337,461 B1 | * | 1/2002 | Yasuda et al. | 219/121.62 |
| 6,453,535 B1 | * | 9/2002 | Nicholas | 29/413 |
| 7,000,942 B2 | * | 2/2006 | Lutze et al. | 280/728.3 |
| 2001/0010423 A1 | * | 8/2001 | Bauer et al. | 280/728.3 |
| 2004/0207181 A1 | * | 10/2004 | Hayashi et al. | 280/728.3 |
| 2005/0134023 A1 | * | 6/2005 | Cowelchuk et al. | 280/728.3 |

FOREIGN PATENT DOCUMENTS

JP 2003-212075 A * 7/2003

* cited by examiner

*Primary Examiner*—Ruth Ilan
(74) *Attorney, Agent, or Firm*—Roth & Goldman, P.A.

(57) ABSTRACT

An airbag apparatus uses an interior panel of an automobile. The interior panel is formed of a multi-layer sheet including a surface layer, an intermediate foam layer, and a base layer. The interior panel has front and rear hinge grooves and left and right fracture grooves for defining a fracture-opening section, and a center fracture groove for dividing the fracture-opening section into front and rear fracture-opening subsections to be split apart from each other in a casement condition. The hinge grooves, the center fracture groove, and the left and right fracture grooves are formed of laser-machined holes which have different depths and do not pass through the surface layer of the interior panel.

5 Claims, 7 Drawing Sheets

AIRBAG APPARATUS FOR AUTOMOBILE

BACKGROUND OF THE INVENTION

1. Field of the Invention

The present invention relates to an airbag apparatus for an automobile for protecting a person in an automobile such as a car; for example, a driver or a passenger sitting in the front passenger seat, from impact upon head-on or side collision of the automobile to thereby ensure safety of the person. More particularly, the invention relates to an improvement of fracture grooves of a fracture-opening section.

The term "fracture groove" used in relation to the present invention refers to a weakened portion or a fracture portion for fracture opening which is composed of successive holes formed on the reverse or inside surface of an interior panel of an automobile through irradiation with a laser beam generated from laser generation means in the form of laser pluses.

2. Description of the Related Art

An airbag apparatus for a front passenger seat or a driver's seat of an automobile, such as a car, or that to be mounted on a side pillar of the automobile basically includes an airbag, an airbag case for accommodating the folded airbag, and an inflater for inflating the airbag. The airbag apparatus is disposed behind an interior panel of the automobile.

In general, an interior member of an automobile is composed of a panel core formed integrally from a plastic resin material, such as polypropylene, and an instrument panel (hereinafter referred to as an "interior panel"), which is disposed on the surface of the panel core and is composed of a single layer sheet or a multi-layer sheet. The single layer sheet is formed of a plastic resin. The multi-layer sheet is composed of a base layer formed from a plastic resin material, such as polypropylene, an intermediate foam layer, and a surface layer.

Figure 1:
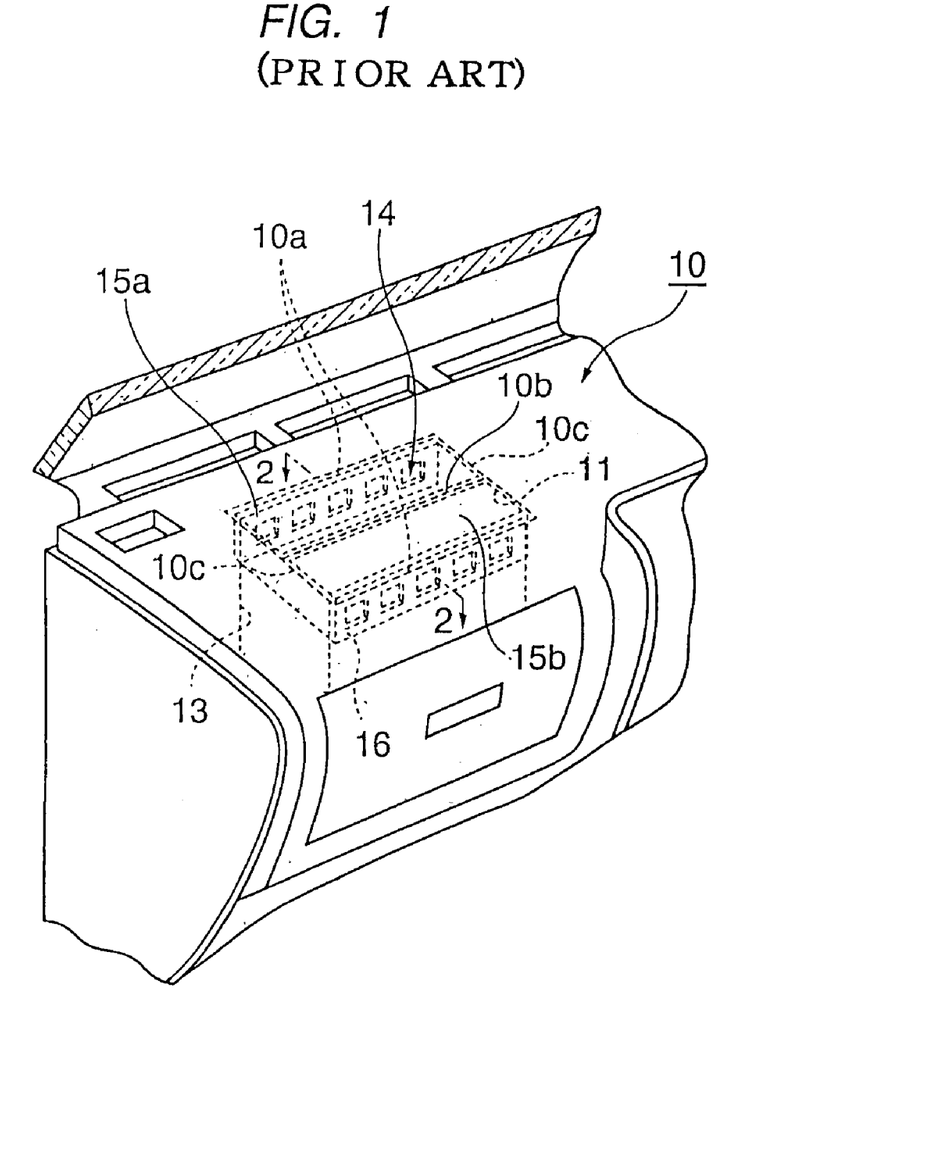
FIG. 1 is a schematic perspective view of a conventional airbag apparatus for a front passenger seat, showing an interior panel composed of a single layer sheet and having a fracture-opening section for allowing an inflating airbag to project outward therethrough.
Figure 2:
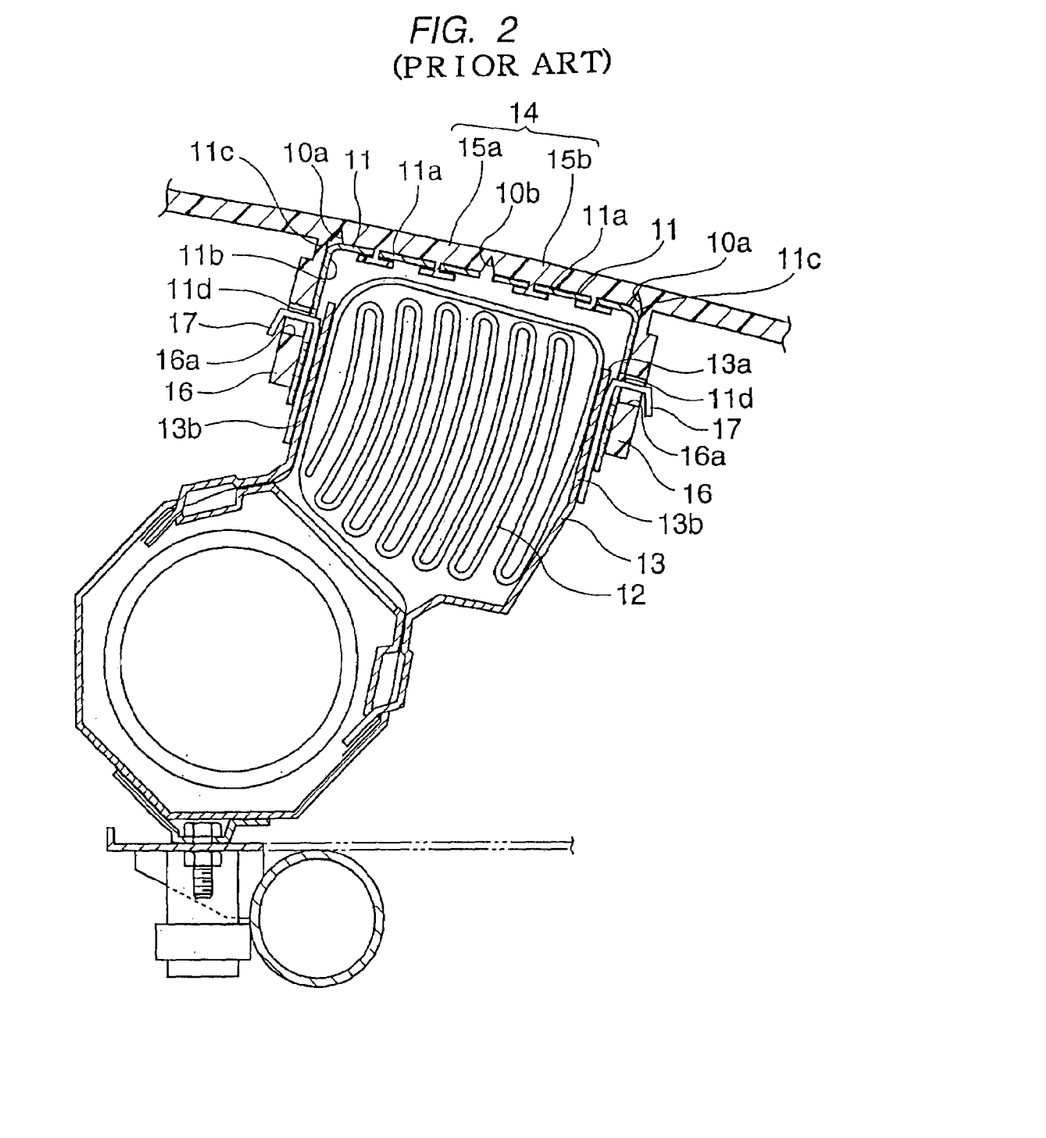
FIG. 2 is a schematic sectional view taken along line 2—2 of FIG. 1.

Conventionally, a seamless-type airbag apparatus for a front passenger seat has been provided (for example, see Japanese Patent Application Laid-Open (kokai) No. 2001-206180). As shown in FIGS. 1 and 2, the seamless-type airbag apparatus is designed to render fracture grooves 10a, 10b, and 10c of a fracture-opening section 14 invisible.

The airbag apparatus includes an airbag 12, an airbag case 13 for accommodating the airbag 12 in a folded condition, and an inflater (not shown) for inflating the airbag 12. The airbag apparatus is disposed inside an interior panel 10.

Specifically, as shown in FIGS. 1 and 2, the interior panel 10 has a fracture-opening section 14 having a size corresponding to that of an upper opening portion 13a of the airbag case 13. The fracture-opening section 14 is formed through provision of front and rear hinge grooves 10a extending longitudinally (in right-left direction), a center fracture groove 10b extending longitudinally, and side fracture grooves 10c extending transversely (in front-rear direction). These grooves 10a, 10b, and 10c are formed on the inside surface of the interior panel 10 by use of a laser. Specifically, a pulsating laser beam output from an unillustrated laser generation means is radiated perpendicular onto the inside surface of the interior panel 10 while being moved along peripheral edges of a pair of reinforcement plate members 11 fixed to the inside surface, thereby forming the grooves 10a, 10b, and 10c.

The longitudinally extending center fracture groove 10b divides the fracture-opening section 14 into a front fracture-opening subsection 15a and a rear fracture-opening subsection 15b. Upon inflation of the airbag, the fracture-opening subsections 15a and 15b are split apart from each other in a casement condition (in opposite directions) while hinging on the front and rear hinge grooves 10a.

When, upon inflation of the airbag, the fracture-opening section 14 of the interior panel 10 is split open by pressure of the inflating airbag 12, the front and rear hinge grooves 10a may be broken, with a resultant separation of the fracture-opening subsections 15a and 15b from the interior panel 10. In order to avoid this problem, the conventional air bag apparatus employs a reinforcing structure including the above-mentioned paired reinforcement plate members 11, which are provided on the inside surface of the fracture-opening section 14 of the interior panel 10. Specifically, a frame-shaped reinforcement rib 16 is formed integrally with the interior panel 10 in such a manner that the rib 16 projects from the inside surface of the interior panel 10, and the rib 16 defines a rectangular space slightly larger than the opening portion 13a of the airbag case 13. The paired reinforcement plate members 11 are disposed within the rectangular space defined by the rib 16. The horizontal portions 11a of the reinforcement plate members 11 are fixedly attached to the inside surface of the fracture-opening section 14 through thermal joining or like processing. Vertical portions 11b of the reinforcement plate members 11 are bent at their hinge portions 11c and extend downward along the inner surfaces of front and rear walls of the reinforcement rib 16. Openings 11d and 16a are formed in the front and rear walls of the reinforcement rib 16 and the corresponding vertical portions 11b of the reinforcement plate members 11, respectively. Hooks 17 attached to front and rear walls 13b of the airbag case 13 are engaged with the corresponding openings 11d and 16a. This structure prevents scattering of the fracture-opening subsections 15a and 15b of the fracture-opening section 14 of the interior panel 10 upon inflation of the airbag.

The thus-configured airbag apparatus functions in the following manner. Upon collision of the automobile, an impact force caused by the collision is detected by a sensor. A control unit including a CPU judges whether or not the detected impact force is equal to or greater than a predetermined value. When the control unit judges that the impact force is equal to or greater than the predetermined value, the control unit issues a signal for causing the inflater to generate a predetermined gas. The gas is fed to the airbag so as to promptly inflate the airbag.

The inflating airbag presses, from inside, the fracture-opening section 14 of the interior panel 10. The fracture-opening section 14 is fractured along the center fracture groove 10b and the side fracture grooves 10c, whereby the fracture-opening subsections 15a and 15b are split open about the front and rear hinge grooves 10a. The thus-opened front and rear fracture-opening subsections 15a and 15b are further opened while being turned inside out about the hinge portions 11c of the reinforcement plate members 11.

Simultaneously, the inflating airbag 12 projects outward from the interior panel 10 through the thus-opened fracture-opening section 14. Serving as a cushion, the inflated airbag 12 supports a front seat passenger at his/her chest and head, thereby protecting the passenger from the impact force of collision.

As described above, in the conventional seamless-type airbag apparatus, hinge grooves (weakened portions) and fracture grooves (for fracture opening) of the fracture-opening section are formed by use of a pulsating laser beam generated from laser generation means. Specifically, the front and back hinge grooves 10a, the center fracture groove 10b, and the side fracture grooves 10c are formed on the inside surface of the interior panel 10 through an operation of radiating a pulsating laser beam onto the inside surface of the interior panel 10 while moving the laser beam along peripheral edges of the pair of reinforcement plate members 11.

Therefore, in the case where an instrument panel is formed of a multi-layer sheet composed of a base layer, an intermediate foam layer, and a surface layer, tip ends of holes formed by means of laser machining may penetrate the surface layer, or reach the foam layer, whereby portions of the foam material in the vicinity of the holes melt. In such a case, depressions or machining marks are formed on the surface of the surface layer, with a resultant deterioration of the esthetic appearance.

Moreover, the center fracture groove 10b of the fracture-opening section 14 is weak against pressing force from the upper side, and a central portion or peripheral edge portion of the fracture-opening section 14 causes deformation such as subsidence. In such a case, shearing stresses act on the interior panel 10 when the airbag is expanded and deployed, and burrs are formed at the periphery of an opening formed upon fracture open of the fracture-opening section 14. In addition, the esthetic appearance of the interior panel is deteriorated considerably at the periphery of the fracture-opening section 14.

SUMMARY OF THE INVENTION

In view of the foregoing, an object of the present invention is to provide an airbag apparatus for an automobile which can improve the esthetic appearance of fracture-groove formed portions of the fracture-opening section of an interior panel, and can smoothly brake the front and rear fracture-opening subsections (door portions) after being opened.

To achieve the above object, the present invention provides an airbag apparatus comprising an airbag disposed in a folded condition behind an interior panel which is formed of a multi-layer sheet including a surface layer, an intermediate foam layer, and a base layer and which has front and rear hinge grooves and left and right fracture grooves for defining a fracture-opening section at a position corresponding to that of the airbag, and a center fracture groove for dividing the fracture-opening section into front and rear fracture-opening subsections to be split apart from each other in a casement condition while being hinged on the front and rear hinge grooves. Each of the hinge grooves, the center fracture groove, and the left and right fracture grooves is formed of a series of holes formed on an inside surface of the interior panel through irradiation with a laser beam. The holes constituting each of the hinge grooves include holes having a depth which is about half the thickness of the base layer of the interior panel, and holes for thickness measurement which are formed at predetermined intervals and have a depth for passing through the foam layer and reaching a thicknesswise central portion of the surface layer. The holes constituting the center fracture groove have a depth for passing through the foam layer and reaching a thicknesswise central portion of the surface layer. The holes constituting each of the left and right fracture grooves include holes having a depth for reaching a position near the boundary between the base layer and the intermediate foam layer, and holes for thickness measurement which are formed at predetermined intervals and have a depth for passing through the foam layer and reaching a thicknesswise central portion of the surface layer.

The above-described configuration improves the esthetic appearance of the fracture-groove formed portions of the fracture-opening section of the interior panel, and enables smooth breaking of the fracture-opening subsections (door portions) after being opened, to thereby prevent damage to the fracture-opening subsections (door portions).

The enter fracture groove may be biased toward the front hinge groove or the rear hinge groove, so that the front and rear fracture-opening subsections have different sizes and are not mutually symmetrical. This configuration prevents interference between the front fracture-opening subsection and the windshield or between the rear fracture-opening subsection and a passenger, which would otherwise occur upon deployment of the airbag.

Each of the left and right fracture grooves has a curved portion which is formed at allocation where the left or right fracture groove intersects with a corresponding end of the center fracture groove and which projects inward.

In this case, when the front and rear fracture-opening subsections are opened upon deployment of the airbag, the front and rear fracture-opening subsections each have chamfered corners at their distal ends, whereby safety is improved.

Moreover, the above-described configuration reduces shearing force acting on the peripheral edge of the fracture-opening section, which shearing force is generated because of expansion force of the airbag at the time of expansion and deployment of the airbag, whereby formation of a sharp edge or burrs at the fractured portion can be prevented, and a smooth fractured surface can be provided.

BRIEF DESCRIPTION OF THE DRAWINGS

Various other objects, features and many of the attendant advantages of the present invention will be readily appreciated as the same becomes better understood by reference to the following detailed description of the preferred embodiments when considered in connection with the accompanying drawings, in which.

DESCRIPTION OF THE PREFERRED EMBODIMENTS

Embodiments of the present invention will next be described in detail with reference to the drawings.

First Embodiment

FIGS. 3–5C show an airbag apparatus for an automobile according to a first embodiment of the present invention and applied to use with a front passenger seat.

Figure 3:
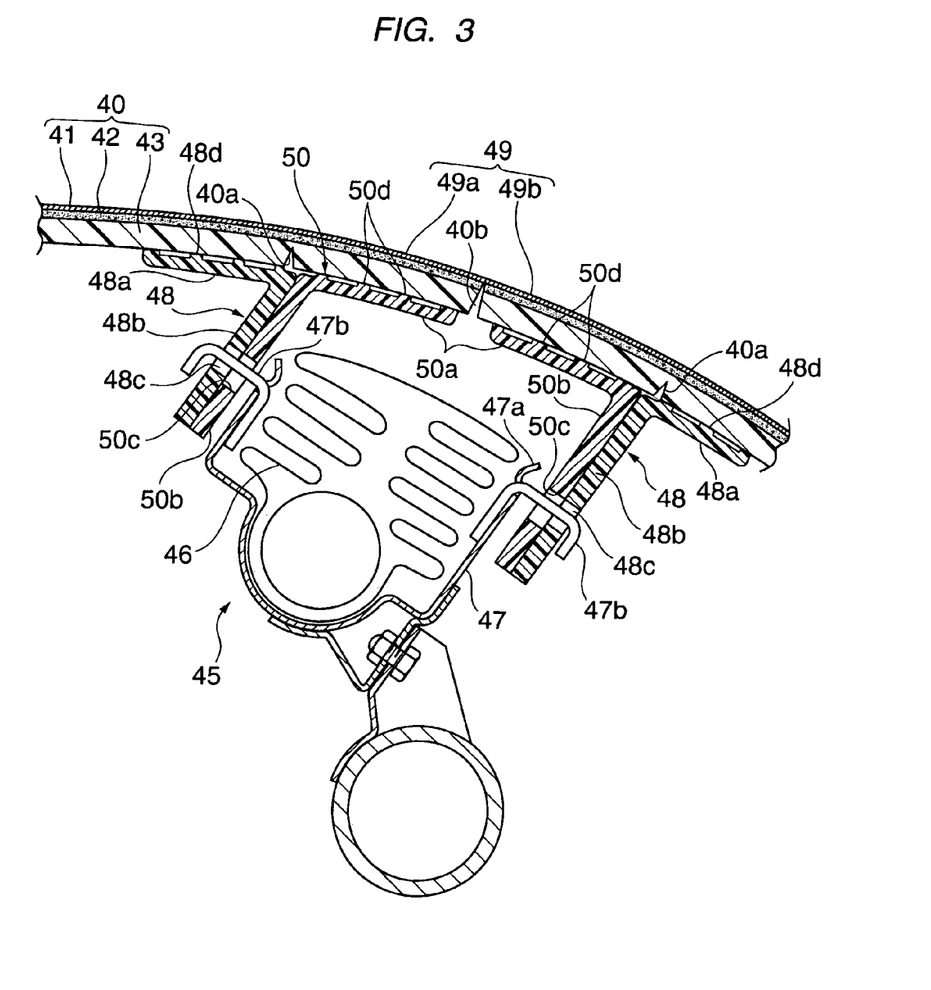
FIG. 3 is a vertical sectional view of a main portion of an airbag apparatus for an automobile according to a first embodiment of the present invention and applied to use with a front passenger seat.

In FIG. 3, reference numeral 40 denotes an interior panel formed of a multi-layer sheet composed of a surface layer 41, an intermediate foam layer 42, and a base layer 43 formed mainly of a thermoplastic resin, such as polypropylene (PP). The interior panel 40 covers an instrument panel core (not shown) formed of a resin and fixed to an unillustrated car body, and is fixedly attached to the instrument panel core by use of appropriate means, such as tapping screws.

As shown in FIG. 3, an accommodation section 45 for accommodating an airbag apparatus for an automobile 44 is formed behind a left-hand portion (for right-hand drive) of the interior panel 40 in opposition to a front passenger seat. A left-hand drive automobile employs a mirror image of the configuration of the present embodiment; i.e., the accommodation section 45 is formed behind a right-hand portion of the interior panel 40.

The airbag apparatus for an automobile 44 includes an airbag 46 to be inflated by means of gas from an inflater; an airbag case 47 which accommodates the airbag 46 in a folded condition and which has an opening section 47a at its upper end; a reinforcement frame member 48 which is formed of a thermoplastic resin material which is similar to that of the base layer 43 of the interior panel 40 and which has a reinforcement edge portion 48a for reinforcing a portion of the interior panel 40 surrounding a fracture-opening section 49; and a pair of reinforcement plate members 50 having horizontal portions 50a welded to the inside surface of the fracture-opening section 49. Hook portions 47b of the airbag case 47 are engaged with rectangular holes 48c and 50c formed in side walls 48b and 50b of the reinforcement frame member 48 and the reinforcement plate members 50, respectively.

Figure 4:
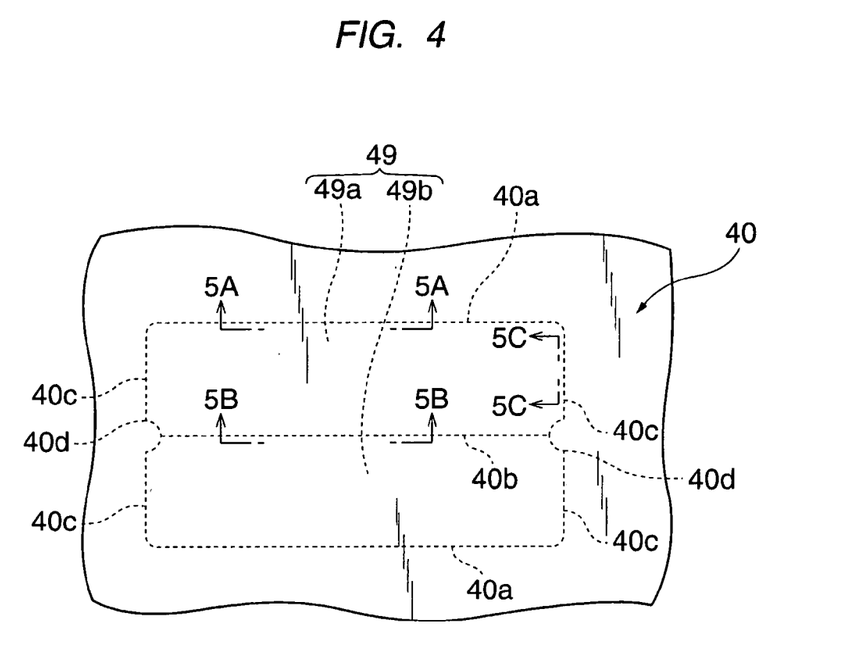
FIG. 4 is a plan view of the fracture-opening section of the interior panel.

As shown in FIG. 4, the fracture-opening section 49 of the interior panel 40 has front and rear hinge grooves 40a formed at front and rear edges, respectively, of the fracture-opening section 49; left and right fracture grooves 40c formed at left and right edges, respectively, of the fracture-opening section 49; and a center fracture groove 40b, which is formed in parallel to the hinge grooves 40a and offset toward the rear hinge groove 40a. The hinge grooves 40a and the fracture grooves 40c define the shape of a rectangular opening on the inside surface of the interior panel 40 facing the opening 47a of the airbag case 47, the opening allowing deployment of the airbag. The center fracture groove 40b divides the fracture-opening section 49 into asymmetric front and rear fracture-opening subsections 49a and 49b. When the airbag 46 is deployed, the fracture-opening subsections 49a and 49b are turned inside out, in opposite directions, about the hinge grooves 40a. The left and right fracture grooves 40c have curved portions 40d which are provided at intersections between the opposite ends of the center fracture groove 40b and the left and right fracture grooves 40c and which project inward.

Figure 5A:
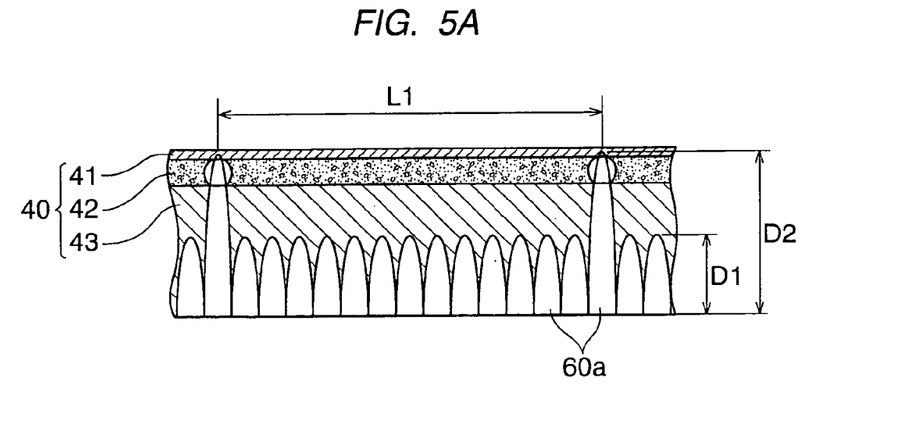
FIGS. 5A to 5C are enlarged partial cross sections taken along lines 5A—5A, 5B—5B, and 5C—5C, respectively, of FIG. 4.
Figure 5B:
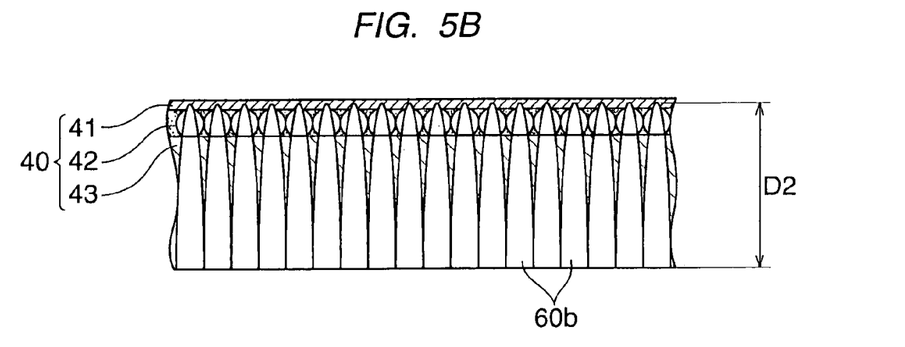
Figure 5C:
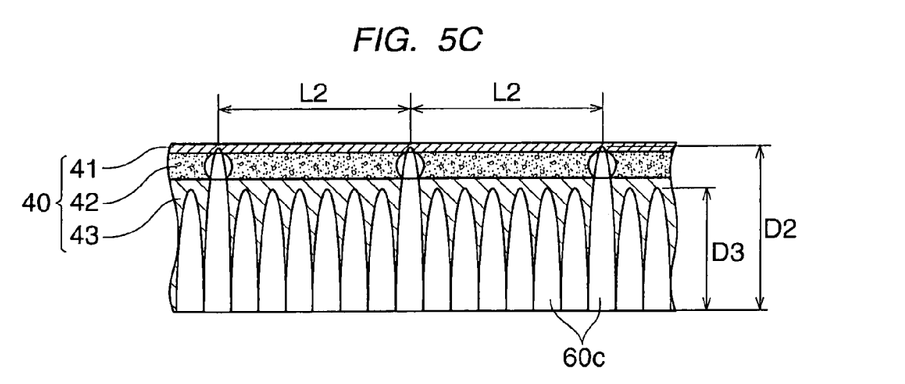

As shown in FIGS. 5A to 5C, the fracture grooves 40b and 40c and the hinge grooves 40a are each formed of a plurality of holes 60a, 60b, or 60c, which are successively formed on the inside surface of the interior panel 40 through irradiation with a laser beam. The depth of the holes 60b of the center fracture groove 40b is made greater than those of the holes 60a of the hinge grooves 40a and the holes 60c of the left and right fracture grooves 40c. The depths are determined so that the tip ends of the holes do not pass through the surface layer 41 in the thickness direction.

The holes 60a, which constitute the hinge grooves 40a, include holes having a depth D1, which is about half the thickness of the base layer 43 of the interior panel 40, and holes for thickness measurement which are formed at predetermined long intervals L1 and have a depth D2 for passing through the foam layer 42 and reaching a central portion of the surface layer 41 with respect to the thickness direction. The holes 60c, which constitute the left and right fracture grooves 40c, include holes having a depth D3, which reach a position near the boundary between the base layer 43 and the foam layer 42, and holes for thickness measurement which are formed at predetermined short intervals L2 and have a depth D2 for passing through the foam layer 42 and reaching a central portion of the surface layer 41 with respect to the thickness direction. The holes 60b, which constitute the center fracture groove 40b, have a depth D2 for passing through the foam layer 42 and reaching a central portion of the surface layer 41 with respect to the thickness direction. When holes are formed in a curved portion of the interior panel 40, the irradiation angle of a layer beam is changed from the vertical direction, so that the depth of formed holes changes. In view of this, the holes for thinness measurement are provided at predetermined intervals so as to form holes of a constant depth. In the case of formation of holes which constitute the center fracture groove 40b, each hole is formed while the thickness of the interior panel 40 is measured, so that holes for thickness measurement are not required.

Elongated projections 48d are formed at predetermined intervals on the surface of the reinforcement edge portion 48a of the reinforcement frame member 48, the surface facing the inside surface of the interior panel 40. Similarly, elongated projections 50d are formed at predetermined intervals on the surfaces of horizontal portions 50a of the reinforcement plate members 50, which surfaces face the inside surface of the interior panel 40. The reinforcement edge portion 48a of the reinforcement frame member 48 and the horizontal portions 50a of the reinforcement plate members 50 are fixed to the inner surfaced of the interior panel 40 via the projections 48d and 50d, respectively, by means of vibration welding.

In the airbag apparatus of the present embodiment, when an expansion pressure which is generated at the beginning of expansion and deployment of the airbag 46 acts on the reverse surfaces of the horizontal portions 50a of the reinforcement plate members 50, and the inner wall surface of the vertical side wall 48b of the reinforcement frame member 48, weakened portions of the center fracture groove 40b formed of the deep holes 60b start to tear. Subsequently, weakened portions of the left and right fracture grooves 40c formed of the deep holes 60c tear, whereby the fracture-opening section 49 is split into front and rear fracture-opening subsections 49a and 49b. The fracture-opening subsections 49a and 49b are then turned inside out, in opposite directions, about the hinge grooves 40a formed of the shallow holes 40a. As a result, the airbag 46 having been accommodated in the airbag case 47 in a folded state is deployed outward so as to mitigate the impact acting on a passenger, to thereby ensure safety.

Since a portion of the interior panel 40 surrounding the fracture-opening section 49 and extending along the hinge grooves 40a is reinforced by means of the reinforcement edge portion 48a of the reinforcement frame member 48, the pressure resistance of the interior panel 40, including the fracture-opening section 49, against pressing force from the upper side increases, whereby formation of cracks, distortion, or other deformations during periods in which the airbag apparatus is not operated can be prevented.

In the airbag apparatus of the present embodiment, the reinforcement frame member 48 and the pair of reinforcement plate members 50 are formed of a plastic material similar to that of the interior panel 40, and are fixed to the interior panel 40, by means of vibration welding, via the elongated projections 48d and 50d, which are formed on the reinforcement edge portion 48a of the reinforcement frame member 48 and the horizontal portions 50a of the reinforcement plate members 50, respectively. Accordingly, welding work is easy.

Since the airbag case 47 is disengagably engaged with the reinforcement frame member 48 and the pair of reinforcement plate members 50, the airbag case 47 can be easily removed from the reinforcement frame member 48 and the pair of reinforcement plate members 50 at the time of, for example, disposal of the vehicle. This enables easy separation and removal of the inflator and relevant parts, which become industrial waste, and prevents adverse effects of these parts on the environment.

The thus-configured airbag apparatus according to the first embodiment functions in the following manner. Upon collision of the automobile, an impact force caused by the collision is detected by an unillustrated, known sensor. An unillustrated control unit including a known CPU judges whether or not the detected impact force is at least equal to a predetermined value. When the control unit judges that the impact force is at least equal to the predetermined value, the control unit issues a signal for causing the unillustrated inflater to generate a predetermined gas. The gas is fed to the airbag 46 so as to promptly inflate the airbag 46 (see FIG. 7) to thereby protect the passenger from impact at the time of collision of the vehicle.

Second Embodiment

Figure 6:
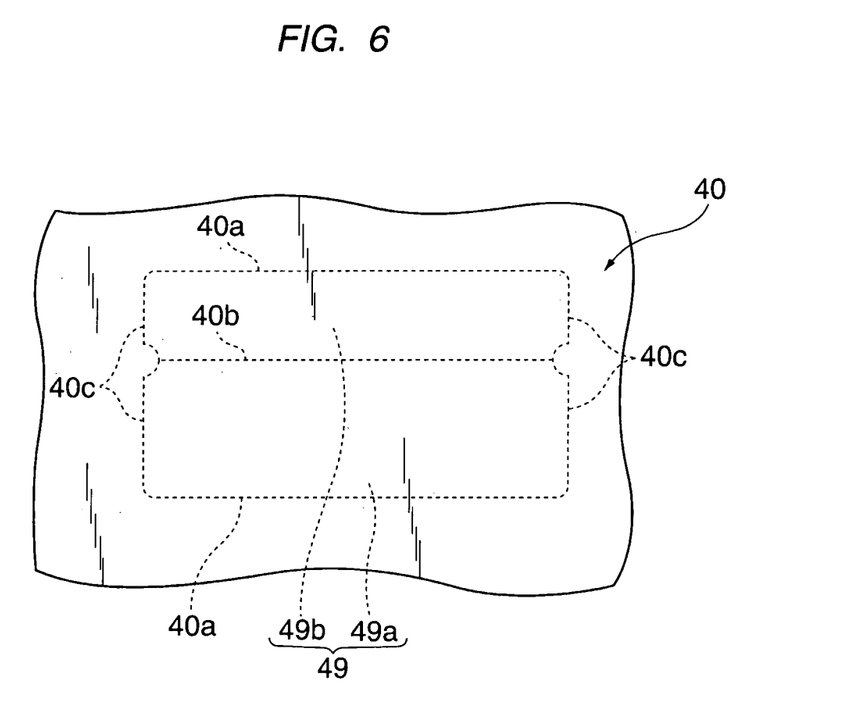
FIG. 6 is a plan view of the fracture-opening section of the interior panel in the case where an airbag apparatus according to a second embodiment of the present invention is applied to a front passenger seat.

FIG. 6 is a plan view of the fracture-opening section of the interior panel in the case where an airbag apparatus according to a second embodiment of the present invention is applied to a front passenger seat. The airbag apparatus according to the present embodiment differs from the airbag apparatus according to the first embodiment in that the center fracture groove 40b is biased toward the front side or the windshield, whereby the front and rear fracture-opening subsections 49a and 49b, formed through splitting of the fracture-opening section 49, have different sizes and shapes, and are not mutually symmetrical.

According to the second embodiment, the occurrence of contract between the front fracture-opening subsection (door portion) and the windshield, which would otherwise occur upon deployment of the airbag, can be avoided.

The remaining portions of the second embodiment have the same structure as the first embodiment. Therefore, the corresponding portions are denoted by the same reference numbers, and their repeated descriptions are omitted.

Third Embodiment

Figure 7:
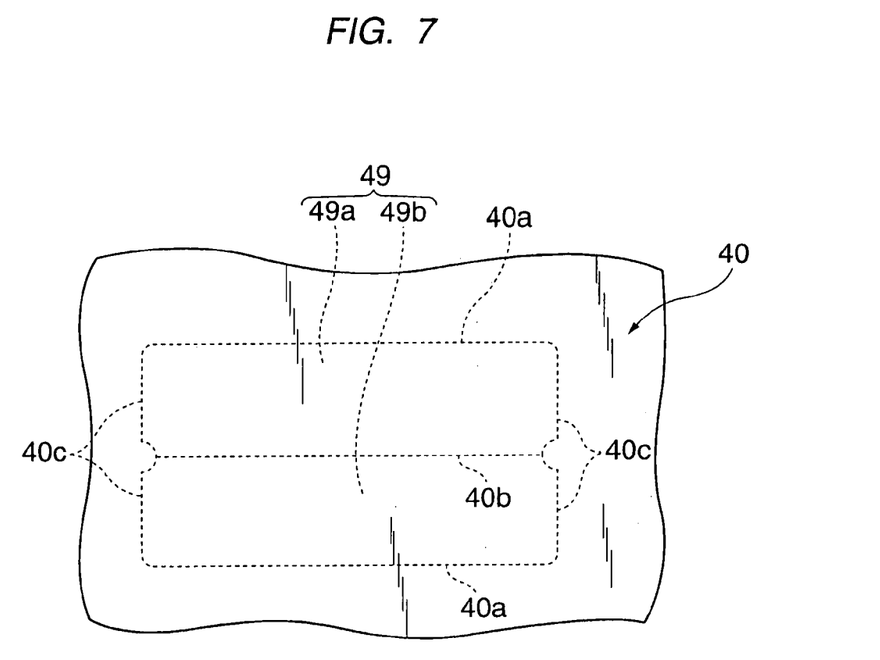
FIG. 7 is a plan view of the fracture-opening section of the interior panel in the case where an airbag apparatus according to a third embodiment of the present invention is applied to a front passenger seat.

FIG. 7 is a plan view of the fracture-opening section of the interior panel in the case where an airbag apparatus according to a third embodiment of the present invention is applied to a front passenger seat. The airbag apparatus according to the present embodiment differs from the airbag apparatus according to the first embodiment in that the center fracture groove 40b is formed at the center between the front and rear hinge grooves 40a, whereby the front and rear fracture-opening subsections 49a and 49b, formed through splitting of the fracture-opening section 49, have identical sizes and shapes, and are mutually symmetrical.

According to the third embodiment, the rear fracture-opening subsection (door portion) can be opened smoothly upon deployment of the airbag.

The remaining portions of the third embodiment have the same structure as the first embodiment. Therefore, the corresponding portions are denoted by the same reference numbers, and their repeated descriptions are omitted.

In the above-described embodiments, the paired reinforcement plate members 50 are formed of plastic resin. However, the paired reinforcement plate members 50 may be formed of bent metal plate members as in conventional airbag apparatuses.

Obviously, numerous modifications and variations of the present invention are possible in light of the above teachings. It is therefore to be understood that within the scope of the appended claims, the present invention may be practiced otherwise than as specifically described herein.

What is claimed is:

1. An airbag apparatus for an automobile, comprising an airbag disposed in a folded condition behind an interior panel which is formed of a multi-layer sheet including a surface layer, an intermediate foam layer, and a base layer and which has front and rear hinge grooves and left and right fracture grooves for defining a fracture-opening section at a position corresponding to that of the airbag, and a center fracture groove for dividing the fracture-opening section into front and rear fracture-opening subsections to be split apart from each other in a casement condition while being hinged on the front and rear hinge grooves, wherein each of the hinge grooves, the center fracture groove, and the left and right fracture grooves is formed of a series of holes formed on an inside surface of the interior panel through irradiation with a laser beam;

the holes constituting each of the hinge grooves include holes having a depth which is about half the thickness of the base layer of the interior panel, and holes for thickness measurement which are formed at predetermined intervals and have a depth for passing through the foam layer and reaching a thicknesswise central portion of the surface layer;

the holes constituting the center fracture groove have a depth for passing through the foam layer and reaching a thicknesswise central portion of the surface layer; and the holes constituting each of the left and right fracture grooves include holes having a depth for reaching a position near the boundary between the base layer and the intermediate foam layer, and holes for thickness measurement which are formed at predetermined intervals and have a depth for passing through the foam layer and reaching a thicknesswise central portion of the surface layer.

2. An airbag apparatus for an automobile according to claim 1, wherein the center fracture groove is biased toward the front hinge groove, so that the front and rear fracture-opening subsections have different sizes and asymmetric shapes.

3. An airbag apparatus for an automobile according to claim 1, wherein the center fracture groove is biased toward the rear hinge groove, so that the front and rear fracture-opening subsections have different sizes and asymmetric shapes.

4. An airbag apparatus for an automobile according to claim 1, wherein each of the left and right fracture grooves has a curved portion which is formed at a location where the left or right fracture groove intersects with a corresponding end of the center fracture groove and which projects inward.

5. An airbag apparatus for an automobile according to claim 1, further comprising a reinforcement frame member having a reinforcement edge portion facing the inside surface of the interior panel and a reinforcement plate member having a portion facing the inside surface of the interior panel, wherein elongated projections are formed at predetermined intervals on the reinforcement edge portion of the reinforcement frame member and the portion of the reinforcement plate member, and the reinforcement edge portion of the reinforcement frame member and the portion of the reinforcement plate member are fixed to the inside surface of the interior panel via the corresponding projections by means of vibration welding.

* * * * *